(12) United States Patent
Hans Wolfgang Coester et al.

(10) Patent No.: US 12,534,113 B2
(45) Date of Patent: Jan. 27, 2026

(54) KINETIC ENERGY CONVERTER FOR A PNEUMATIC TRANSPORTATION SYSTEM

(71) Applicant: Aerom Sistemas De Transporte SA, São Leopoldo (BR)

(72) Inventors: Oskar Hans Wolfgang Coester, Porto Alegre (BR); Marcus Coester, Porto Alegre (BR)

(73) Assignee: Aerom Sistemas De Transporte SA, Sao Leopoldo (BR)

( * ) Notice: Subject to any disclaimer, the term of this patent is extended or adjusted under 35 U.S.C. 154(b) by 816 days.

(21) Appl. No.: 17/788,788

(22) PCT Filed: Dec. 28, 2020

(86) PCT No.: PCT/BR2020/050634
§ 371 (c)(1),
(2) Date: Jun. 24, 2022

(87) PCT Pub. No.: WO2021/134121
PCT Pub. Date: Jul. 8, 2021

(65) Prior Publication Data
US 2023/0037191 A1 Feb. 2, 2023

Related U.S. Application Data

(60) Provisional application No. 62/954,624, filed on Dec. 29, 2019.

(51) Int. Cl.
*B61B 13/12* (2006.01)
*B61D 43/00* (2006.01)
*B61H 9/06* (2006.01)
(52) U.S. Cl.
CPC ............ *B61B 13/122* (2013.01); *B61D 43/00* (2013.01); *B61H 9/06* (2013.01)

(58) Field of Classification Search
CPC .......... B61B 13/122; B61D 43/00; B61H 9/06
See application file for complete search history.

(56) References Cited

U.S. PATENT DOCUMENTS 3,722,424 A   3/1973  Van Veldhuizen
4,285,279 A * 8/1981  Chiappetti ............. B61D 43/00
                                                        105/49

(Continued)

FOREIGN PATENT DOCUMENTS

BR           9912112 A     5/2001
CN        106428081 A  *  2/2017  ............. B61D 43/00

(Continued)

OTHER PUBLICATIONS

International Search Report in international application No. PCT/BR2020/050634 mailed Mar. 30, 2021, 3 pages.

(Continued)

*Primary Examiner* — Robert J McCarry, Jr.
(74) *Attorney, Agent, or Firm* — Berg Hill Greenleaf Ruscitti LLP (57) ABSTRACT

The kinetic energy converter is coupled to a bogie of a pneumatic propulsion vehicle for a transportation system of passengers and cargo. The kinetic energy converter (6) is mounted in at least one of the axle sets (4) of the bogie structure (1). The kinetic energy converter (6) is comprised of an electric generator provided with a housing (10) where an electric generator rotor (16) spins, provided with a rotor pulley (15) moved by a belt (11) driven by a freewheel pulley (14) mounted on a drive shaft (13) provided with shaft ends (25) which are mounted onto wheel hubs (24) of the bogie structure (1). The axle set (4) is comprised of guide tubes (7) whose internal ends have flanges (8) which are connected to the supports (9) of the electric generator housing (10).

3 Claims, 8 Drawing Sheets

(56) References Cited

U.S. PATENT DOCUMENTS 4,587,906 A  5/1986 Coester
4,658,732 A  4/1987 Coester

FOREIGN PATENT DOCUMENTS

EP    2829727 A1   1/2015
EP    3279054 A1   2/2018
WO    2017017627 A1   2/2017

OTHER PUBLICATIONS

Written Opinion/International Preliminary Examination Report in international application No. PCT/BR2020/050634 mailed Mar. 30, 2021, 3 pages.

* cited by examiner

KINETIC ENERGY CONVERTER FOR A PNEUMATIC TRANSPORTATION SYSTEM

CROSS REFERENCE TO RELATED APPLICATION

This application is a national stage application under 35 U.S.C. 371 of PCT Application No. PCT/BR2020/050634 having an international filing date of Dec. 28, 2020, which designated the United States, which PCT application claimed the benefit of U.S. Application Ser. No. 62/954,624, filed Dec. 29, 2019, both of which are incorporated by reference in their entirety.

FIELD OF THE INVENTION

This invention refers to a kinetic energy converter which is coupled to a bogie of a pneumatic propulsion vehicle for passengers and cargo with the purpose of converting kinetic energy of the wheels into rotational movement in order to preferably generate electric energy to power-up onboard utilities or, alternatively, to be coupled directly to any other mechanical rotating machine, such as air conditioning compressors, air compressors, hydraulic pumps and other.

BACKGROUND OF THE INVENTION

The Brazilian patent certificate PI 9912112-3 and its corresponding U.S. Pat. No. 6,213,026 describe a transportation system for passengers and cargo whose vehicles are pneumatically propelled onto a guideway by means of a propulsion plate inside the air duct, which is defined by the guideway itself comprising the vehicle movement alignment.

The pneumatically propelled vehicles are provided with bogies containing preferably two axles, each one with two metallic wheels which roll on rails fastened onto the guideway. At least one of the axles is connected to a pylon faced downwards and bolted to a propulsion plate which has an area equivalent to the air duct inner cross-section, being the referred plate responsible by the conversion of the air flow thrust into mechanical work in order to move the vehicles along the rails of the special elevated guideway.

The elevated guideway superstructure is mounted on the vertical piers having a primary function of supporting and steering the vehicles, and a not less important secondary function of forming in its interior the propulsion duct. Therefore, the elevated guideway is responsible for creating the physical means of support and guidance for the vehicle movement, as well as the means of channeling the air flow generated by stationary power propulsion units positioned in rooms distributed along the vehicle trackway.

Each power propulsion unit installed into the passenger stations is integrated by a heavy-duty industrial blower and a set of air flow control and direction valves, which are responsible for increasing or decreasing the pression within the duct created by the superstructure beams.

The pneumatic transportation system operates according to the principle of guideway segmentation into multiple different sections, defining dedicated propulsion circuits and, thus, exclusive and independent io automatic control blocks for each vehicle. Therefore, the advance of a specific vehicle into the next control block is only allowed if it is unoccupied.

The referred pneumatic transportation system of the prior art requires a sizeable amount of electric power supply for the vehicle onboard utilities, including air conditioning, controls, lighting, communications, doors etc.

BRIEF DESCRIPTION OF THE INVENTION

The kinetic energy converter for bogies of pneumatic propulsion vehicles for passengers and cargo object of this invention is capable of transforming kinetic energy of the rotating wheels preferably into electric energy using an electric generator as a mean to feed onboard utilities or, alternatively, to drive any other mechanical device directly related to the vehicle. The converter can operate full-time complementing, or even entirely replacing, a conventional power supply system based on current collector shoes and power rails or pantographs and overhead wires (catenary), combined with energy accumulators such as battery packs.

When the kinetic energy converter is used part-time, it can function as a regenerative system in descending grades and during vehicle braking. The energy converter can be conveniently coupled and uncoupled to the bogie axles by a special clutch system. At least one axle can be equipped with its own energy converter with independent operation monitored and commanded by the vehicle onboard control system.

The kinetic energy converter for the pneumatic propulsion vehicle object of this invention results on the following advantages:
Increase in the energy efficiency for propulsion of pneumatic propulsion vehicles;
It can be used full-time or part-time, since it is provided with a mechanism with a clutch which allows to couple and uncouple the converter drive shaft;
Wear reduction of the energy collectors (shoes or pantographs) and external conductors (power rail bus or overhead wire), or even the complete elimination of those subsystems, which would result in a substantial reduction of the capital and operational expenditures.
When directly driving a mechanical machine—such as an air conditioning compressor, which demands most of the energy provided onboard—it has the potential to allow the transportation system operation to continue in case of an external power supply unavailability, since the remaining electrical loads can be easily fed by the vehicle own emergency batteries for a certain amount of time, or even indefinitely, when periodically recharged at stations during the dwell time.

BRIEF DESCRIPTION OF THE DRAWINGS

For the kinetic energy converter for pneumatic propulsion vehicle of this invention to be completely understood and taken to practice by any multidisciplinary group of technician of this technological sector, it is clearly and sufficiently described based on the attached drawings listed below.

DETAILED DESCRIPTION OF THE INVENTION

Figure 1:
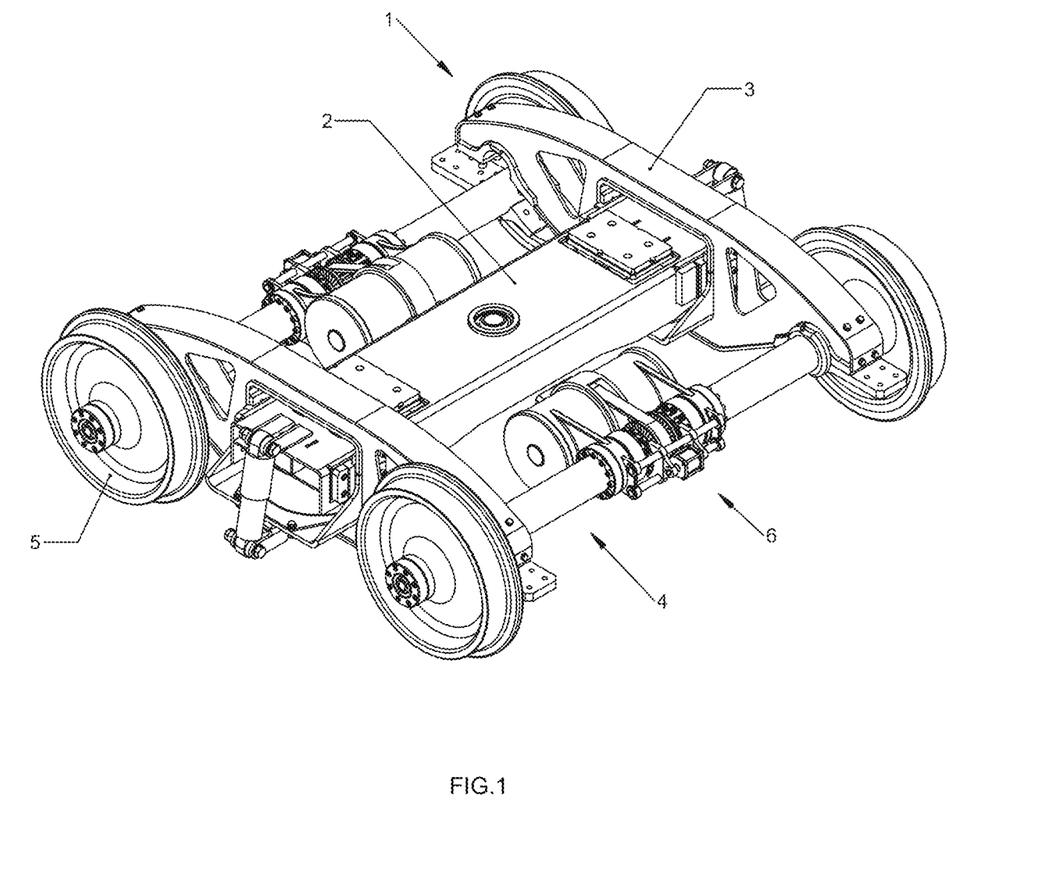
FIG. 1—view of the bogie separated from the pneumatic propulsion vehicle and with the kinetic energy converter installed.

FIG. 1 illustrates the bogie of the pneumatic propulsion vehicle which encompasses a bogie structure (1) formed by a bolster (2) and side frames (3). In the side frames (3), preferably, two axle sets (4) are mounted into bearings, each one having two metallic wheels (5) which roll on rails fastened onto the guideway (not illustrated). In at least one of the axle sets (4) of the bogie structure (1), a kinetic energy converter (6) is mounted.

Figure 2:
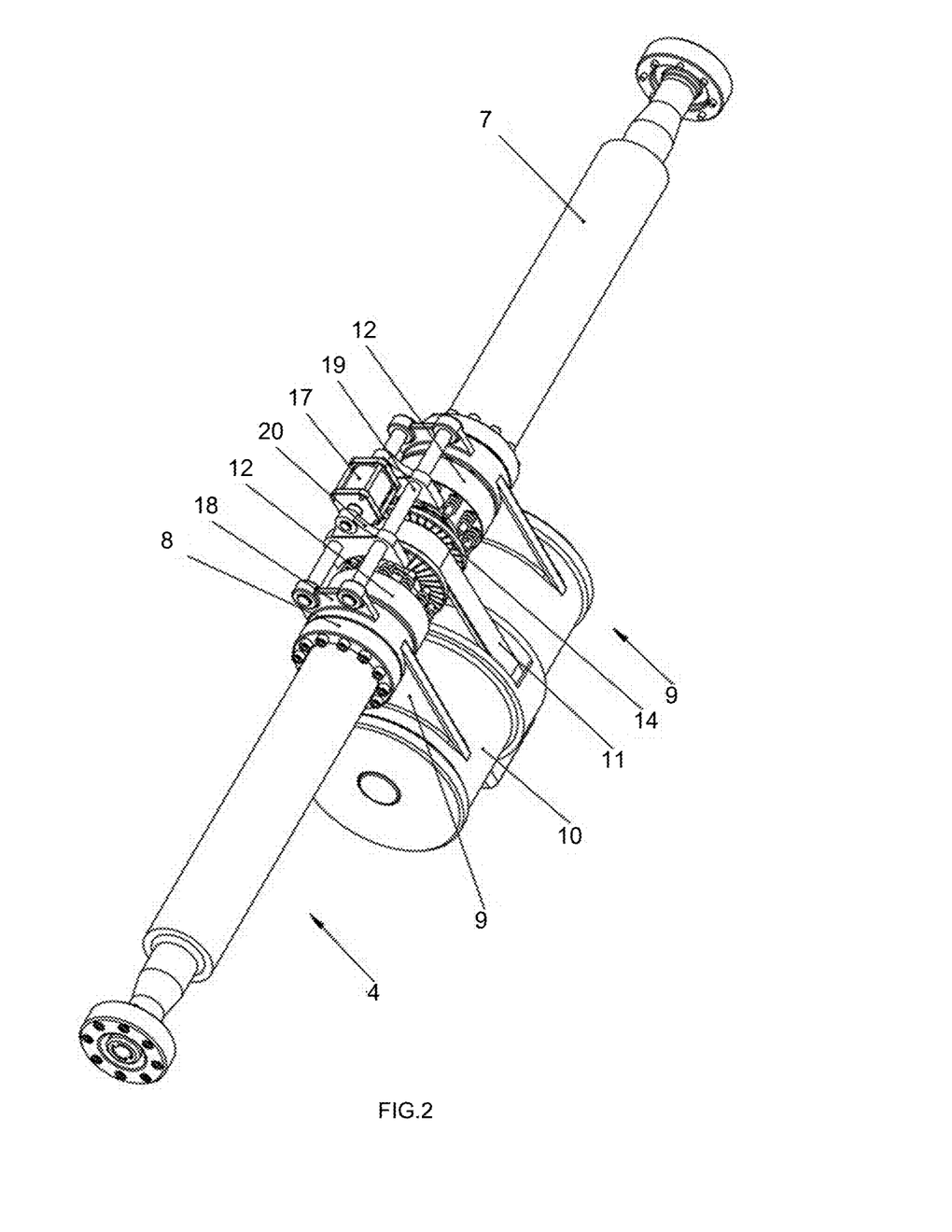
FIG. 2—view of the kinetic energy converter separated from the vehicle bogie.

FIG. 2 details the kinetic energy converter (6) which encompasses an electric energy generator installed on the axle set (4). The axle set (4) is comprised by guide tubes (7) whose external ends are connected in the side frames (3) of the bogie structure (1) (illustrated in the FIG. 1) and the internal ends have flanges (8) which are connected with the supports (9) of the electric generator housing (10). The electric generator shaft is supported by bearings which are in turn supported in the housing (10) and moved by a belt (11), preferably a synchronous belt.

In a preferred embodiment, the supports (9) of the electric generator housing (10) hold side clutches (12) which transmit torque to a center freewheel pulley (14) (illustrated in the FIGS. 3 and 4) and a belt (11).

Figure 3:
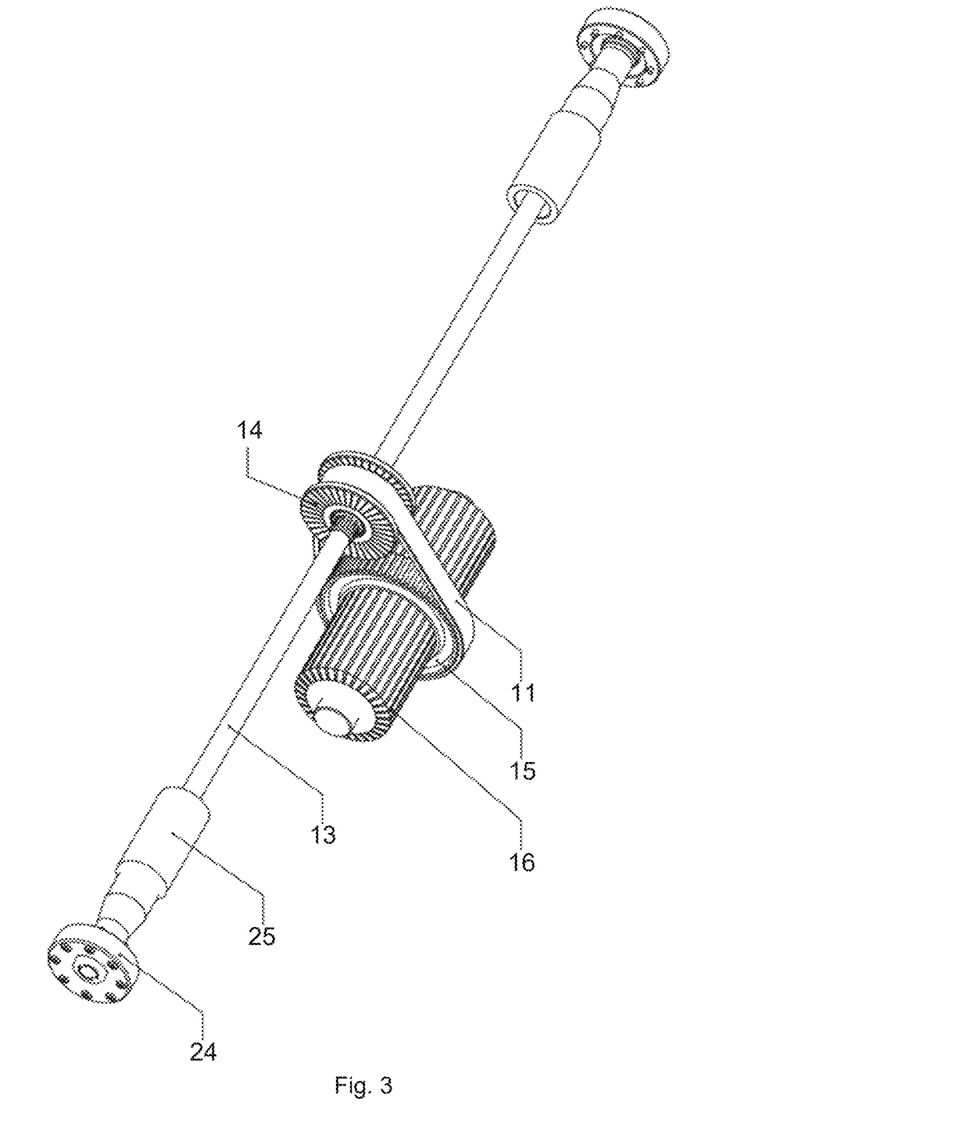
FIG. 3—view of the mechanism which comprises the kinetic energy converter.
Figure 4:
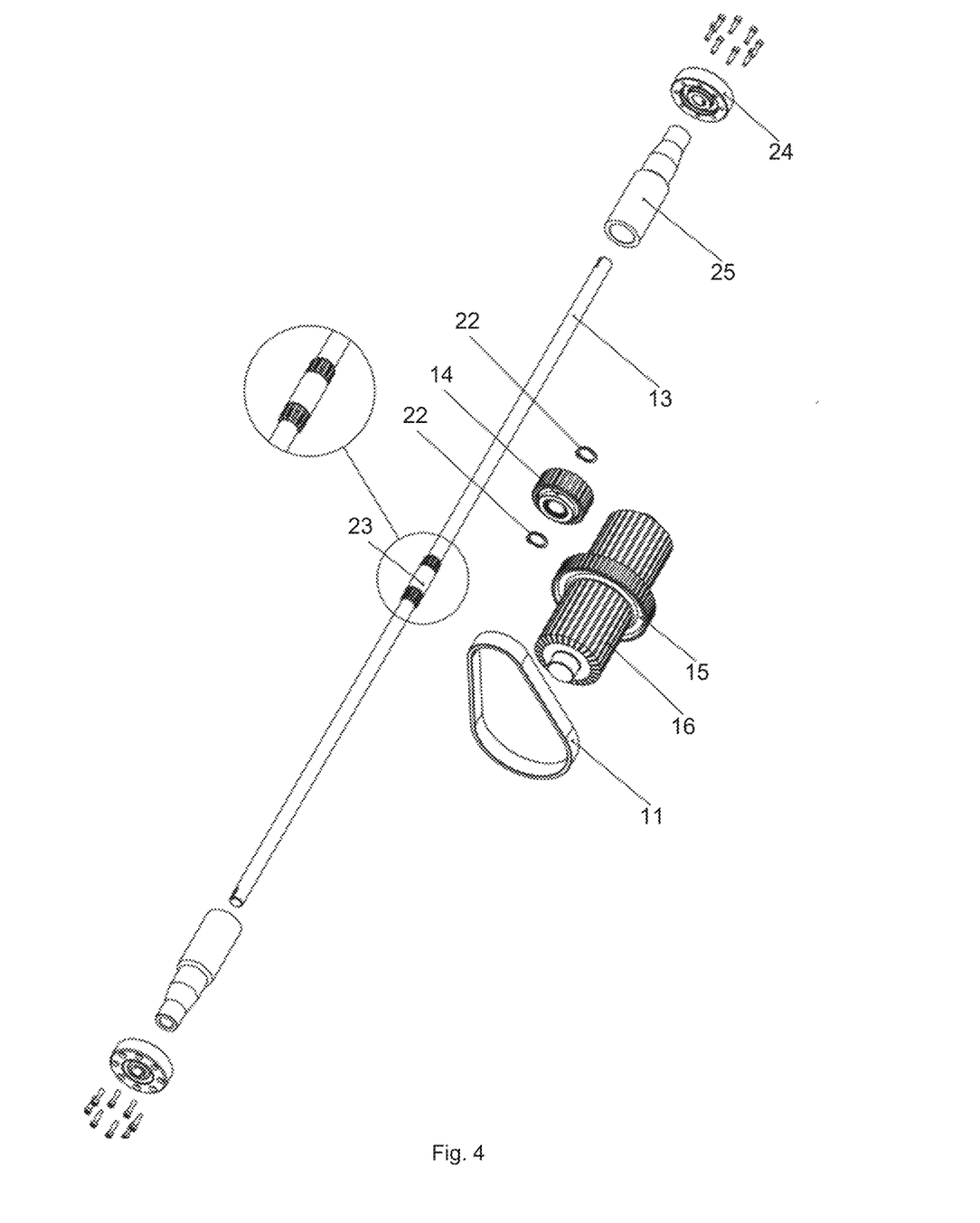
FIG. 4—exploded view of the kinetic energy converter mechanism.

FIGS. 3 and 4 detail the kinetic energy converter (6) which is driven by a drive shaft (13) provided with shaft ends (25) where the wheel hub (24) is mounted. In the drive shaft (13), a freewheel pulley (14) with a belt (11) is positioned to transmit the rotational movement to the rotor pulley (15) of the electric generator rotor (16). Two rings (22) are positioned at each side of the freewheel pulley (14) preventing its lateral displacement, and a spline (23) is put on the center of the drive shaft (13) to gear the belt system.

Returning to the FIG. 2, it is presented a preferential actuation form of the side clutches (12) which occurs by means of commanding an electrical, hydraulic or pneumatic actuator (17), which uncouples the kinetic energy converter whenever needed. To accomplish that, the electric generator housing (10) supports (9) have retractors (18) which are interconnected by sliding guides (19) where the clutch supports (20) slide. When the actuator (17) is commanded to extend, a lateral displacement of the clutch supports (20) occurs guided by the sliding guides (19), io disengaging the side clutches (12) by moving them away from the drive shaft (13) splines (23), ceasing the spin of the freewheel pulley (14), hence interrupting the torque transmission to the rotor pulley (15) of the electric generator rotor (16).

This device allows the part-time use of kinetic energy converter (6) to function as a regenerative system, for instance, during descending grades and breaking.

Figure 5A:
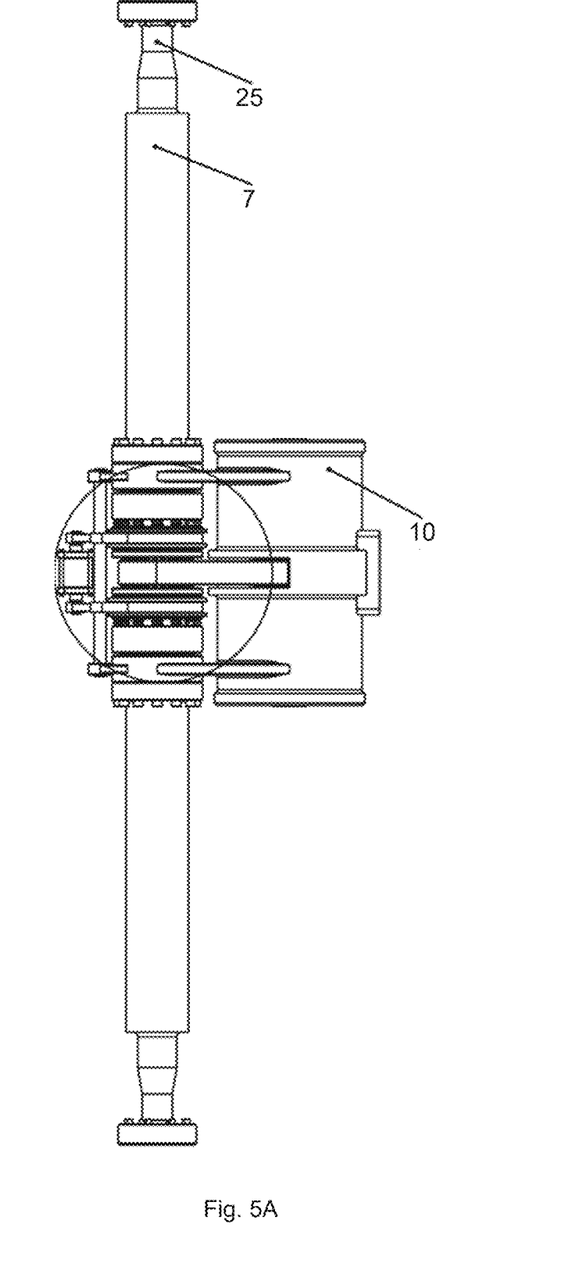
FIG. 5A—frontal view of the coupled kinetic energy converter mechanism.
Figure 5B:
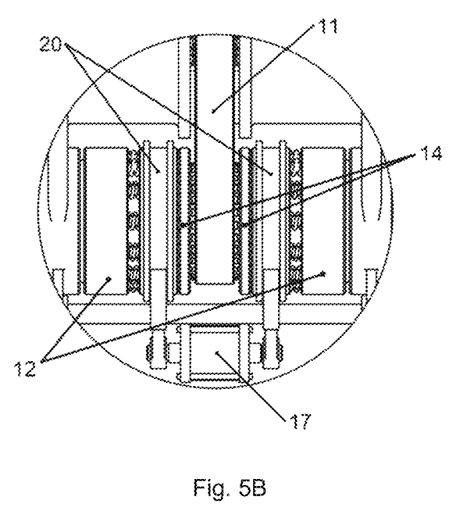
FIG. 5B—detail of FIG.5A.
Figure 6A:
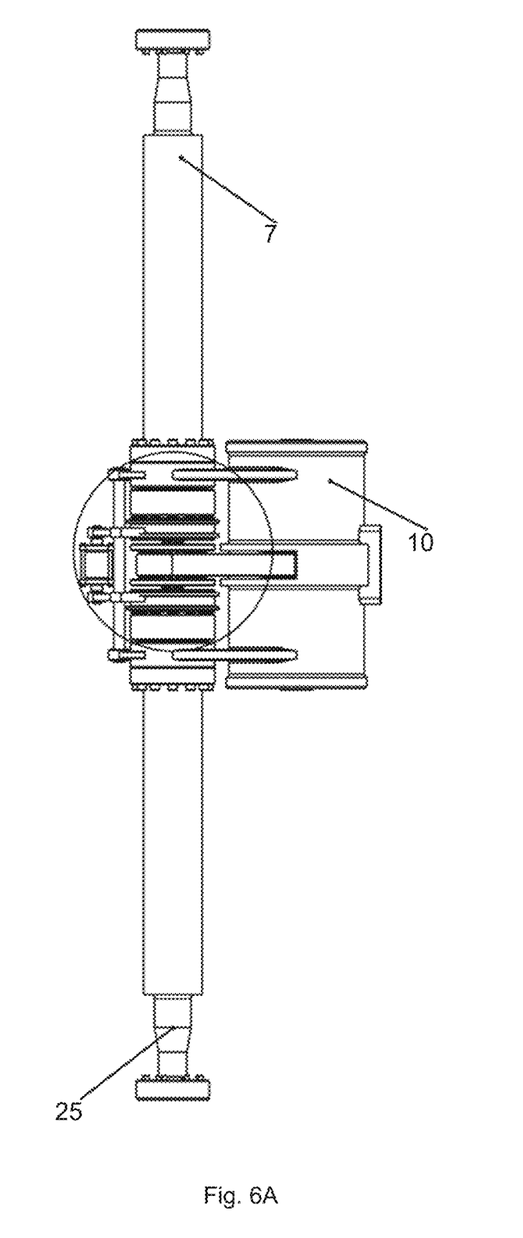
FIG. 6A—frontal view of the uncoupled kinetic energy converter mechanism.
Figure 6B:
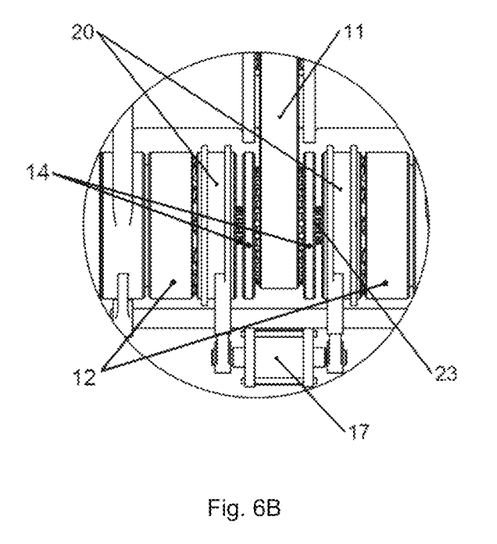
FIG. 6B—detail of FIG.6A.

FIG. 5A and FIG. 5B show the kinetic energy converter at the coupled position, while the FIG. 6A and FIG. 6B show the kinetic energy converter at the uncoupled position. When the actuator (17) is pressurized/powered, the clutch supports (20) move away from the freewheel pulley (14) releasing it by clearing the side clutches (12) from the drive shaft (13) spline (23). The drive shaft (13) is covered by the guide tubes (7).

The invention claimed is:

1. A kinetic energy converter for pneumatic transportation system comprising:
    a kinetic energy converter installed in a bogie of a pneumatic propulsion vehicle having a bogie structure formed by a bolster and side frames and at least two axle sets, each axle set having two metallic wheels which roll on rails fastened onto a vehicle guideway, said kinetic energy converter further comprising:
        an electric generator provided with a housing within which a rotor is adapted to spin, said rotor provided with a rotor pulley which is moved by a belt and driven by a freewheel pulley mounted on a drive shaft provided with shaft ends wherein wheel hubs of the bogie structure are mounted;
        wherein the axle set comprises guide tubes having external and internal ends, said external ends connected to the side frames of the bogie structure and said internal ends having flanges which are connected with supports of the electric generator housing; and
        wherein the axle set is provided with side clutches which actuate on splines and on the freewheel pulley, interrupting or transmitting torque to the belt of the electric generator rotor; and
    wherein the side clutches are laterally displaced by an electrical, hydraulic or pneumatic actuator which are adapted to uncouple the kinetic energy converter.

2. The kinetic energy converter of claim 1, wherein the supports of the electric generator housing are provided with retractors which are interconnected by sliding guides where the clutch supports slide.

3. A pneumatic propulsion vehicle for passenger and cargo comprising: at least one kinetic energy converter according to claim 1, wherein said kinetic energy converter is coupled to an onboard utility on a pneumatic propulsion vehicle or directly to an inboard machine.

\* \* \* \* \*